(12) United States Patent
Bugeja et al.

(10) Patent No.: US 10,808,863 B2
(45) Date of Patent: Oct. 20, 2020

(54) VALVE ARRANGEMENT

(71) Applicant: Schaeffler Technologies AG & Co. KG, Herzogenaurach (DE)

(72) Inventors: Jacob Bugeja, Comber (CA); Nathanael Biester, Rochester, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/267,805

(22) Filed: Feb. 5, 2019

(65) Prior Publication Data
US 2020/0248836 A1 Aug. 6, 2020

(51) Int. Cl.
F16K 11/04 (2006.01)
F16K 31/53 (2006.01)
F16K 11/087 (2006.01)
F01P 7/14 (2006.01)

(52) U.S. Cl.
CPC ........ F16K 31/535 (2013.01); F16K 11/0873 (2013.01); F01P 2007/146 (2013.01); F01P 2070/10 (2013.01)

(58) Field of Classification Search
CPC .. F16K 11/0873; F16K 11/165; F16K 31/535; F01P 2007/146
See application file for complete search history.

(56) References Cited

U.S. PATENT DOCUMENTS

| 6,254,058 | B1 | 7/2001 | Keller |
| 6,568,428 | B2* | 5/2003 | Pecci ............... F16K 27/003 137/595 |
| 8,496,228 | B2 | 7/2013 | Burgess et al. |
| 9,382,833 | B2* | 7/2016 | Morein ............... F16K 11/165 |
| 9,500,299 | B2* | 11/2016 | Morein ............... F16K 11/0876 |
| 9,890,865 | B2 | 2/2018 | Morin et al. |
| 2010/0282190 | A1* | 11/2010 | Stoermer ........... F16K 11/0856 123/41.08 |
| 2013/0140476 | A1 | 6/2013 | Burgess et al. |
| 2015/0027575 | A1* | 1/2015 | Morein .............. F16K 11/165 137/865 |
| 2015/0354714 | A1* | 12/2015 | Morein .............. F16K 11/0856 137/625.46 |
| 2017/0058753 | A1 | 3/2017 | Lee et al. |

FOREIGN PATENT DOCUMENTS

| DE | 102016201246 A1 | 8/2017 |
| KR | 100729178 B1 | 6/2007 |

* cited by examiner

Primary Examiner — Reinaldo Sanchez-Medina
(74) Attorney, Agent, or Firm — Volpe Koenig

(57) ABSTRACT

In one embodiment, a valve arrangement is disclosed. The valve arrangement includes a housing defining a chamber, and the housing includes a plurality of ports. A first valve assembly includes a first valve body arranged and a second valve assembly includes a second valve body. A gear arrangement is configured to drive the first valve body in a first rotational direction and is configured to drive the second valve body in a second rotational direction, and the second rotational direction is opposite from the first rotational direction.

18 Claims, 13 Drawing Sheets

|  | Control Point 1 | Control Point 2 | Control Point 3 | Control Point 4 | Control Point 5 | Control Point 6 | Control Point 7 |
| --- | --- | --- | --- | --- | --- | --- | --- |
| Valve 1 | Closed | 19b Open | 19b Open | Closed | 19a Open | 19a Open | Closed |
| Valve 2 | 19b' Open | 19b' Open | Closed | Closed | Closed | 19a' Open | 19a' Open |

Fig. 5B

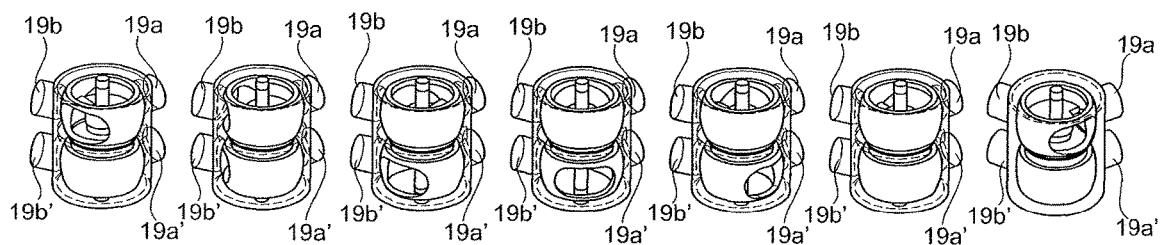
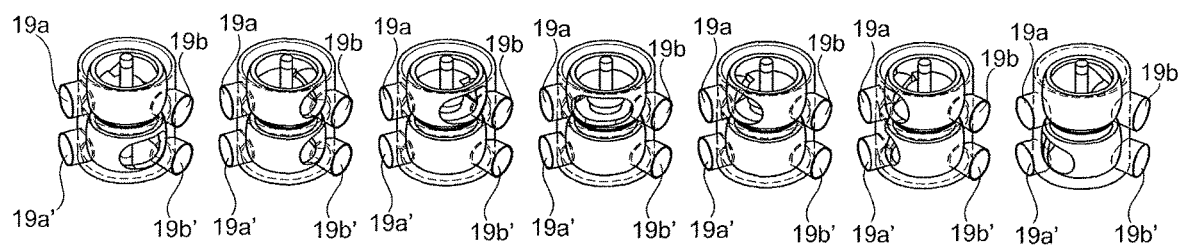
Fig. 6A   Fig. 6B   Fig. 6C   Fig. 6D   Fig. 6E   Fig. 6F   Fig. 6G

VALVE ARRANGEMENT

FIELD OF INVENTION

The present invention relates to a valve arrangement, and more specifically relates to a valve arrangement including a gear arrangement.

BACKGROUND

Valve arrangements can be used in a wide range of applications to achieve a wide variety of flow patterns and conditions for associated ports, chambers, and other fluid vessels. One type of valve arrangement is included in thermal management modules (TMM) or coolant control valves (CCV), which are used in a variety of powertrain applications to provide temperature control to facilitate increased efficiency and other advantages.

Coolant systems are integrated within internal combustion engines and transmissions to keep these components at their most efficient operating temperature. If the temperature of the engine is excessively high or low, then engine performance suffers, knocking occurs, or the engine experiences a variety of other detrimental effects. Existing coolant systems are disclosed in US Pub. 2017/0058753 and DE 102016201246.

Rotary ball valves are used to provide a variety of closing logic configurations. However, to provide more advanced valve logic arrangements, potential solutions include additional rotary ball valves or an increase in size of the rotary ball valve, which is undesirable due to space constraints in engines.

One way of providing differing valve logic arrangements is to provide gear sets or assemblies. Known valve arrangements including gear sets are disclosed in U.S. Pat. Nos. 6,254,058; 8,496,228; 9,890,865; and KR 100729178 B1.

It would be desirable to provide a valve arrangement that is compact and provides a reliable sealing function between seal components.

SUMMARY

In one embodiment, a valve arrangement is disclosed. The valve arrangement includes a housing defining at least one chamber and a plurality of ports. The at least one chamber can include a first chamber and a second chamber. A first valve assembly includes a first valve body arranged within the chamber, and a second valve assembly includes a second valve body arranged within the chamber. A gear arrangement is configured to drive the first valve body in a first rotational direction and is configured to drive the second valve body in a second rotational direction, and the second rotational direction is opposite from the first rotational direction.

In another embodiment, a valve arrangement includes a housing defining at least one chamber a plurality of ports connected to the at least one chamber. A first valve assembly includes a first valve body and a sun gear, and the first valve body is arranged within the chamber. A second valve assembly includes a second valve body and a ring gear, and the second valve body is arranged within the chamber. A bushing is arranged between the first chamber and the second chamber, and the bushing defines a plurality of planetary gear retainers. A plurality of planet gears are arranged between the ring gear and the sun gear such that teeth of the planet gears engage both the ring gear and the sun gear, and each planet gear of the plurality of planet gears arranged on a respective gear retainer of the plurality of planetary gear retainers.

In another embodiment, a method of selectively providing flows through a housing is provided. The method includes providing a valve arrangement including: a housing defining at least one chamber, and the housing includes a plurality of ports. A first valve assembly includes a first valve body and a sun gear, and the first valve body is arranged within the chamber. A second valve assembly includes a second valve body and a ring gear. The second valve body is arranged within the chamber. An input is shaft connected to at least one of the first valve assembly or the second valve assembly. A gear arrangement is positioned between the first valve body and the second valve body. The method includes rotating the input shaft to provide a driving input to the gear arrangement, such that the first valve body rotates in an opposite direction from the second valve body.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 5B is a schematic diagram of varying flows and control points according to an embodiment.

FIGS. 6A-6G include front perspective and rear perspective views of the valve arrangement at six different control points.

DETAILED DESCRIPTION OF THE PREFERRED EMBODIMENTS

Figure 1:
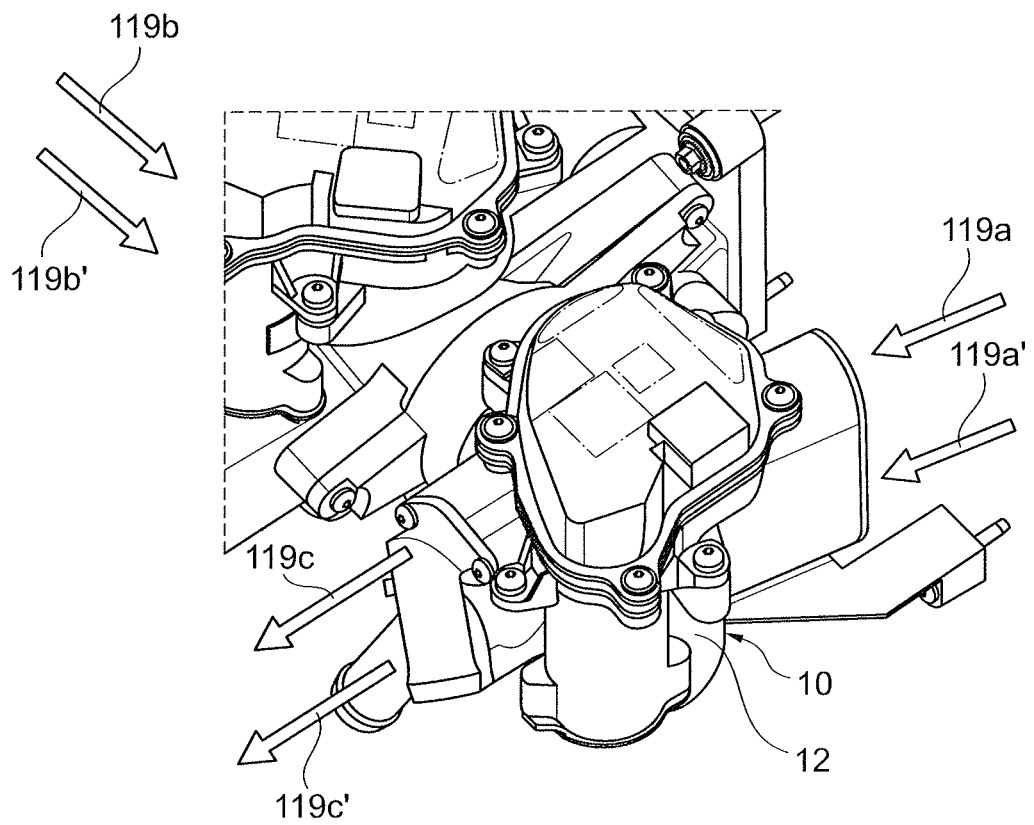
FIG. 1 is a perspective view of a valve arrangement according to an embodiment.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or circular opening. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A valve arrangement 10 according to one embodiment is shown in FIG. 1. The valve arrangement 10 includes a housing 12. As shown in FIG. 1, the valve arrangement 10 is adapted to be installed in a motor vehicle, and provide connections to a first line 119a, second line 119a', third line 119b, fourth line 119b', first exchanger line 119c, and second exchanger line 119c'. In one embodiment, the first line 119a is a first cooling fluid line 119a, the second line 119a' is a second cooling fluid line 119a', the third line 119b is a first heating fluid line 119b, and the fourth line 119b' is a second heating fluid line 119b'.

In one embodiment, the first lines are connected to a transmission and the second lines are connected to an engine. One of ordinary skill in the art would understand that the lines could connect to other components or each other in any combination.

Figure 2A:
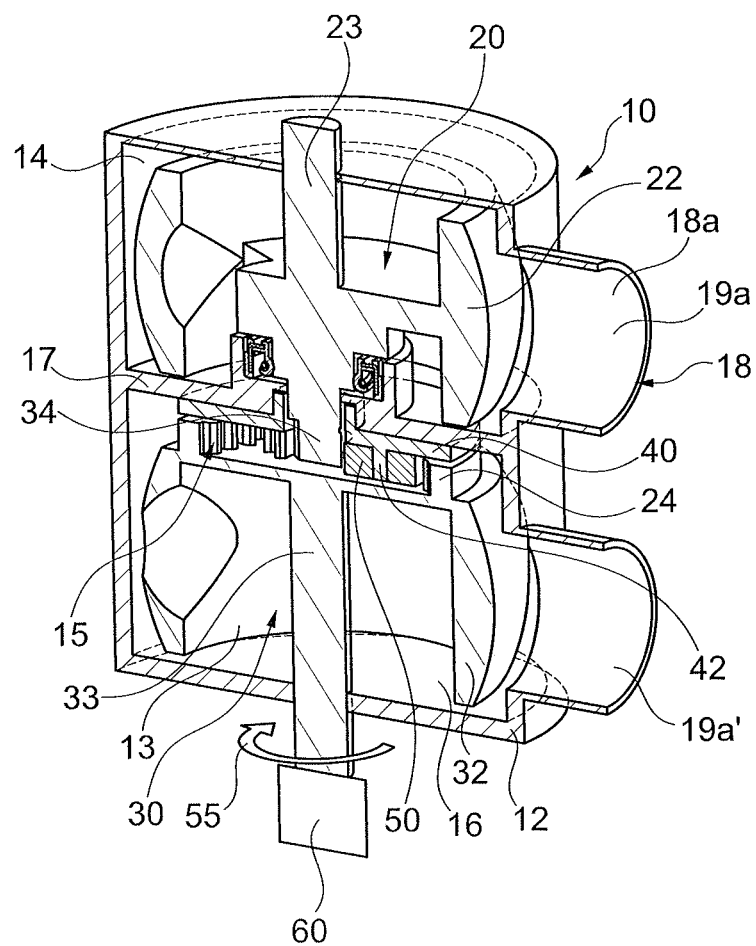
FIG. 2A is a perspective cut-away view of the valve arrangement according to FIG. 1.

As shown in more detail in FIG. 2A, the housing 12 defines at least one chamber 13. As shown in FIG. 2A, in one embodiment, the at least one chamber 13 can include a first chamber 14 and a second chamber 16. As shown in FIG. 2A, in one embodiment, the two chambers 14, 16 are completely isolated from each other but share a common outer wall and a common separation wall 17. As shown in FIGS. 7A-7D, the housing 12' can define a single chamber 13' and lack a separation wall 17. In the embodiment of FIGS. 7A-7D, valve bodies 22', 32' define chambers for controlling the flow of fluid through the housing 12'. The embodiment of FIGS. 7A-7D is otherwise functionally similar to the embodiment associated with FIG. 2A and operates in the same manner as described herein. A single chamber housing 112 arrangement is also disclosed in FIGS. 8A-8D.

In one embodiment, the first chamber 14 is associated with the transmission and the second chamber 16 is associated with the engine. In another embodiment, the second chamber 16 is associated with the transmission and the first chamber 14 is associated with the engine.

Figure 4:
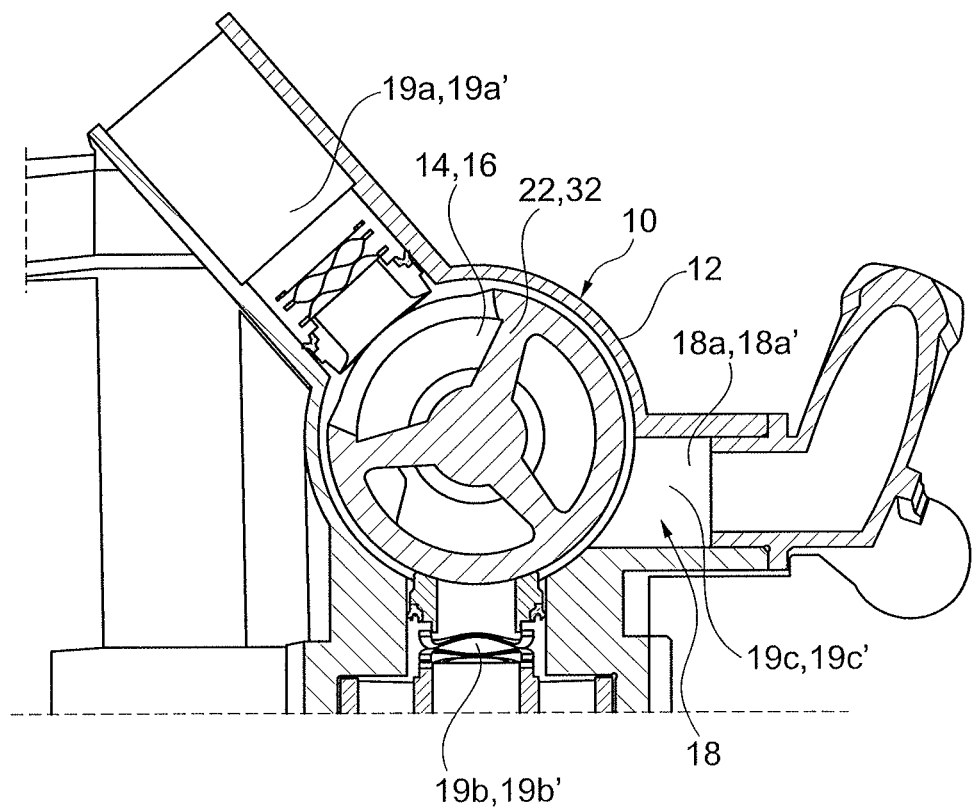
FIG. 4 is a top view of a valve arrangement according to an embodiment.

The housing 12 including a plurality of ports 18. The plurality of ports 18 includes a first plurality of ports 18a connected to the first chamber 14 and a second plurality of ports 18a' connected to the second chamber 16. The arrangements of the ports 18a, 18a' are shown in a single chamber in the drawing in FIG. 4 for simplicity, however one of ordinary skill in the art would understand that the first chamber 14 and second chamber 16 are separated and each include a separate set of ports.

In one embodiment, each chamber 14, 16 includes three ports, which can include a cooling port, a heating port, and an exchanger port. Alternatively, a single chamber, i.e. chamber 13' in FIGS. 7A-7D, can include six ports. The cooling port and the heating port are inlets while the exchanger port is an outlet. The cooling port and the heating port each have valve seats (which may include biasing elements) adapted to engage the valve closing bodies. In contrast, the exchanger ports are always open.

In one embodiment, the first plurality of ports 18a includes: a first port 19a adapted to be connected to a first cooling input; a second port 19b adapted to be connected to a first heating input; and a third port 19c adapted to be connected to a first heat exchanger outlet.

In one embodiment, the second plurality of ports 18a' includes: a first port 19a' adapted to be connected to a second cooling input; a second port 19b' adapted to be connected to a second heating input; and a third port 19c' adapted to be connected to a second heat exchanger outlet.

Two valve assemblies 20, 30 are provided. A gear arrangement 15 is configured to drive the first valve body 22 in a first rotational direction and is configured to drive the second valve body 32 in a second rotational direction, opposite from the first rotational direction, in response to a driving input 55.

In one embodiment, an actuator 60 is adapted to engage at least one of the first valve body 22 or the second valve body 32 (such as through a shaft) to provide the driving input 55. The driving input 55 and actuator 60 can be provided through any number of driving input arrangements.

A first valve body 22 is arranged within the first chamber 14, and a second valve body 32 is arranged within the second chamber 16. A first assembly of the valve assemblies 20, 30 includes a sun gear 34 and a second assembly of the valve assemblies 20, 30 includes a ring gear 24. The location of the ring gear 24 and the sun gear 34 can be reversed such that the first valve body 22 includes the sun gear 34 and the second valve body 32 includes the ring gear 24, or vice versa.

Based on a position of the valve bodies 22, 32, the ports are variably opened and closed. The first valve body 22 and the second valve body 32 both define a single circumferential opening and generally have an identical closing body structure, i.e. a circular body with one opening.

In one embodiment, the first valve body 22 includes a first shaft 23 extending outside of the first chamber 14, and the second valve body 32 includes a second shaft 33 extending outside of the second chamber 16. The first valve body 22 and the first shaft 23 are integrally formed as a single unitary component, and the second valve body 32 and the second shaft 33 are integrally formed as a single unitary component. The driving input 55 is achieved via rotating engagement with at least one of the shafts 23, 33. A single one of the shafts 23, 33 can be provided.

Figure 2B:
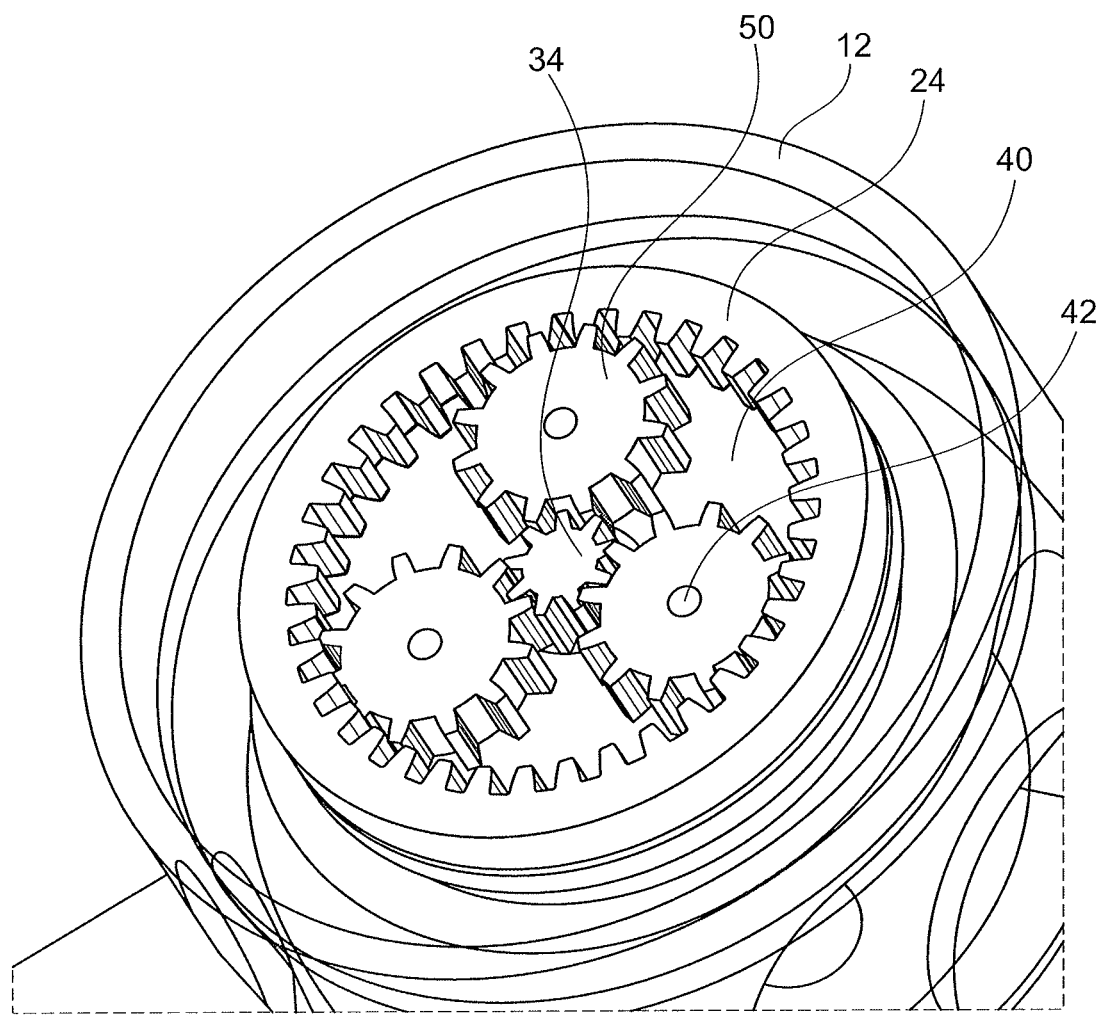
FIG. 2B is a magnified view of a gear arrangement of the valve arrangement of FIG. 2A.

As shown in FIGS. 2A and 2B, in one embodiment, planet gears 50 are arranged between the ring gear 24 and the sun gear 34. The valve arrangement 10 can further include a bushing 40 arranged axially between the first chamber 14 and the second chamber 16. The bushing 40 defines a plurality of planetary gear retainers 42 adapted to support a respective planet gear of the plurality of planet gears 50. The bushing 40 is rotationally fixed and stationary. The bushing 40 can be press fit into the housing 12 in either the first chamber 14 or the second chamber 16.

Figure 3A:
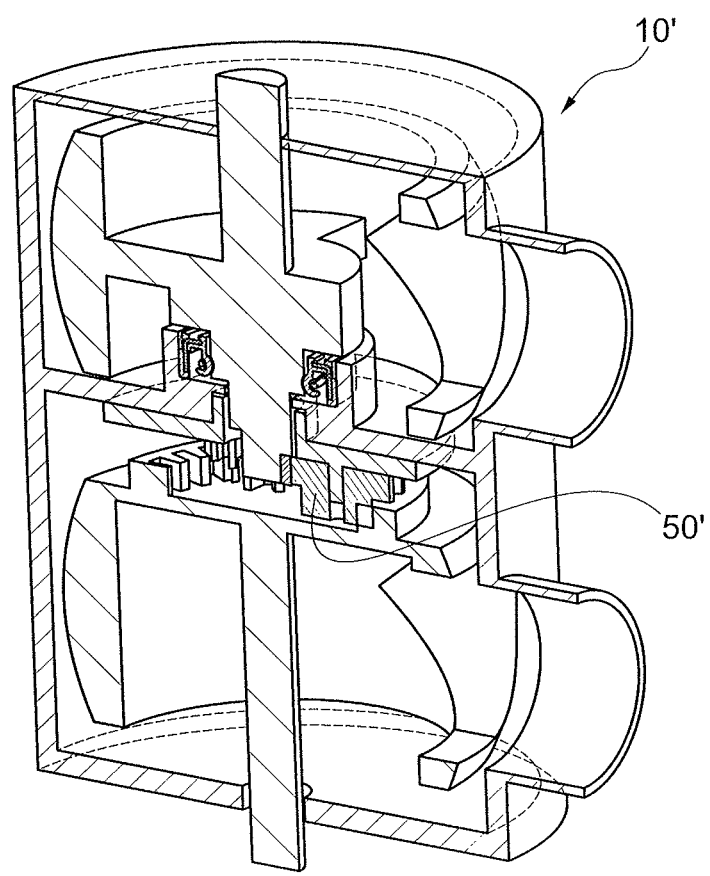
FIG. 3A is a perspective cut-away view of an embodiment of a gear arrangement for the valve arrangement.
Figure 3B:
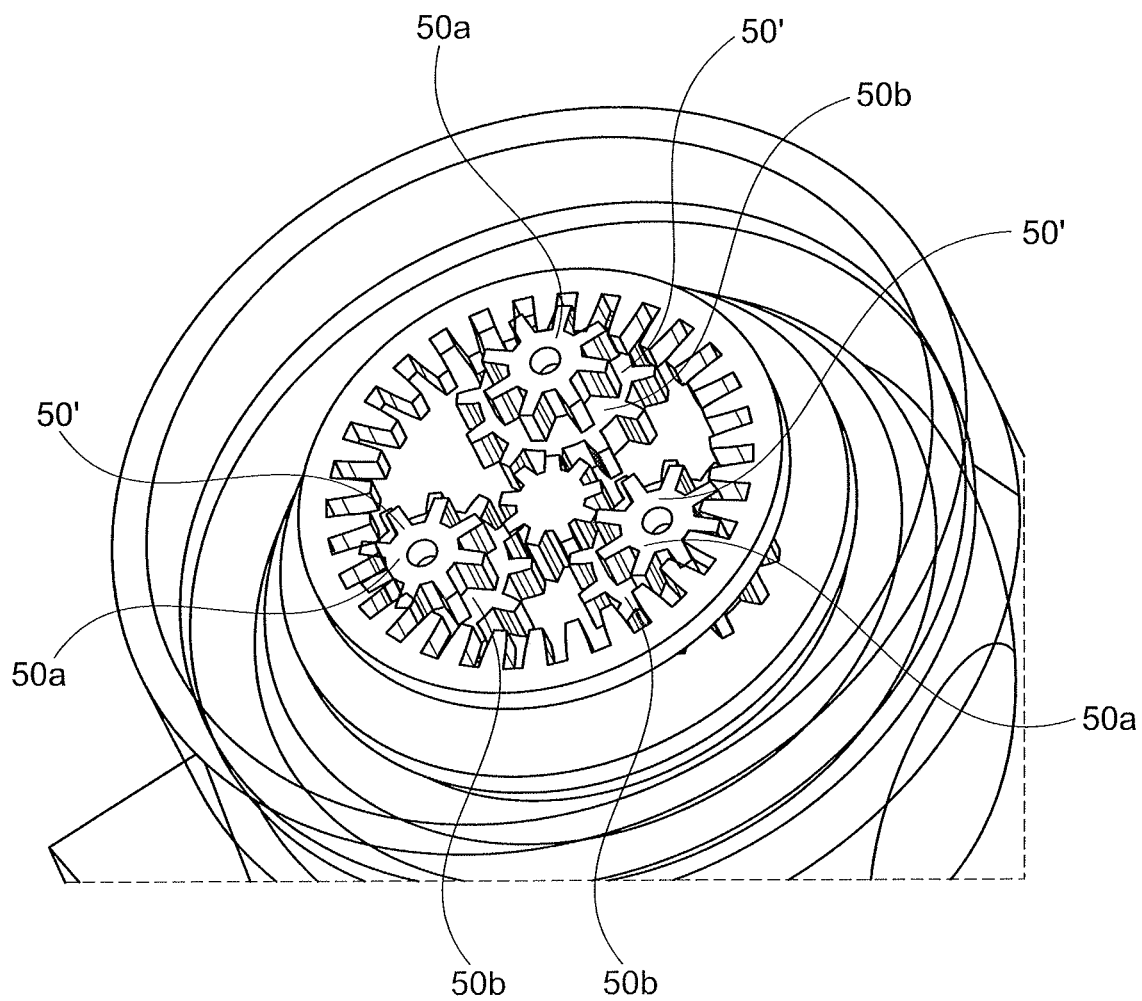
FIG. 3B is a magnified view of the gear arrangement of FIG. 3A.

As shown in FIGS. 3A and 3B, in one embodiment, each planet gear 50' includes a first set of teeth 50a and a second set of teeth 50b, and the first set of teeth 50a engage the ring gear 24 and the second set of teeth 50b engage the sun gear 34. The first set of teeth 50a are a different size than the second set of teeth 50b. The first set of teeth 50a engage the ring gear 24 and the second set of teeth 50b engage the sun gear 34.

One of ordinary skill in the art would understand based on the present disclosure (i.e. FIGS. 2A and 2B compared to FIGS. 3A and 3B) that the exact configuration of gears within the gear arrangement 15 can be varied to provide a variety of valve control logic configurations.

The valve arrangement 10 can include a shaft seal arranged between (i) a portion of the first chamber 14 or the second chamber 16, and (ii) at least one of the first shaft 23 or the second shaft 33. The shaft seal can include a metallic frame and compressible sealing body. Other sealing arrangements can be provided to ensure no fluid leakage occurs between the two chambers 14, 16 while still allowing for inter-chamber mechanical interaction, i.e. via the gear arrangement 15.

In another embodiment, a method of selectively providing flows through a housing 12 is provided. The valve arrangement 10 includes the housing 12 defining the first chamber 14 and the second chamber 16, and the housing 12 includes the plurality of ports 18. The valve arrangement 10 includes the first valve assembly 20 with the first valve body 22 and the ring gear 24, and the first valve body 22 arranged within the first chamber 14.

The valve arrangement 10 includes the second valve assembly 30 with the second valve body 32 and the sun gear 34, and the second valve body 32 is arranged within the second chamber 16. The input shaft 23, 33 is connected to at least one of the first valve assembly 20 or the second valve assembly 30. The gear arrangement 15 is configured to drive the first valve body 22 in a first rotational direction and configured to drive the second valve body 32 in a second rotational direction, opposite from the first rotational direction, in response to a driving input 55.

The method includes rotating the input shaft 23 and/or 33 to provide the driving input such that the first valve body 22 rotates in an opposite direction from the second valve body 32.

The arrangements disclosed herein generally provide a reverse driving arrangement between the first and second valve assemblies 20, 30. In one embodiment, the gear arrangement 15 provides a 1:−1 valve-to-valve gear ratio. One of ordinary skill in the art would recognize that other embodiments can provide varying gear ratios.

Figure 5A:
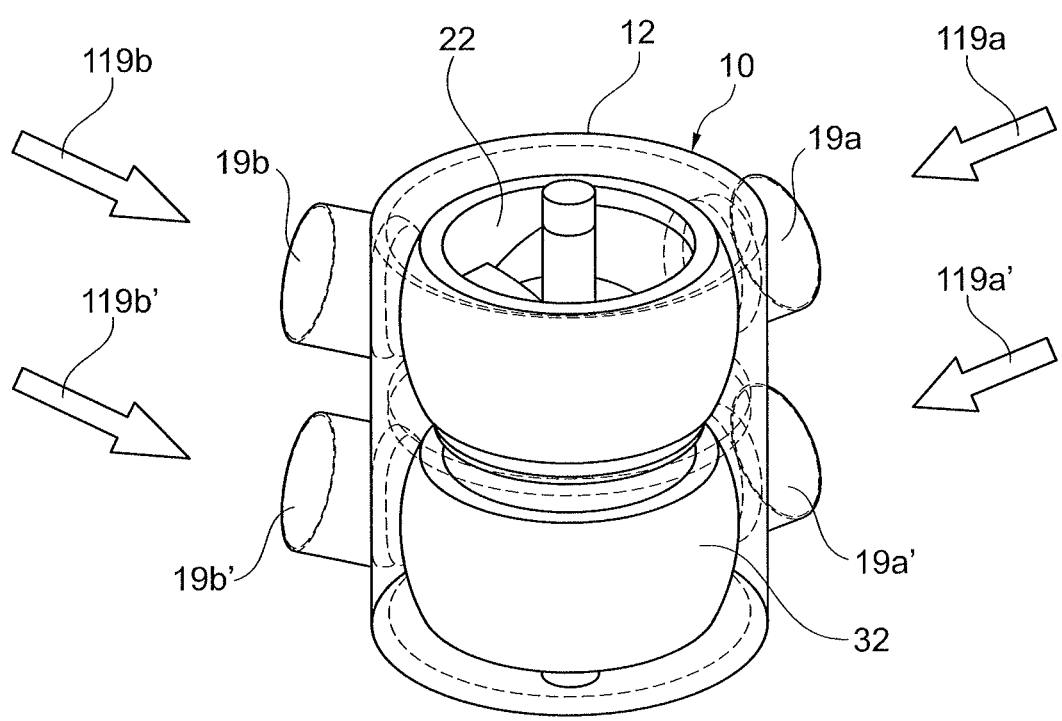
FIG. 5A is a perspective view of the valve arrangement according to an embodiment.
Figure 7A:
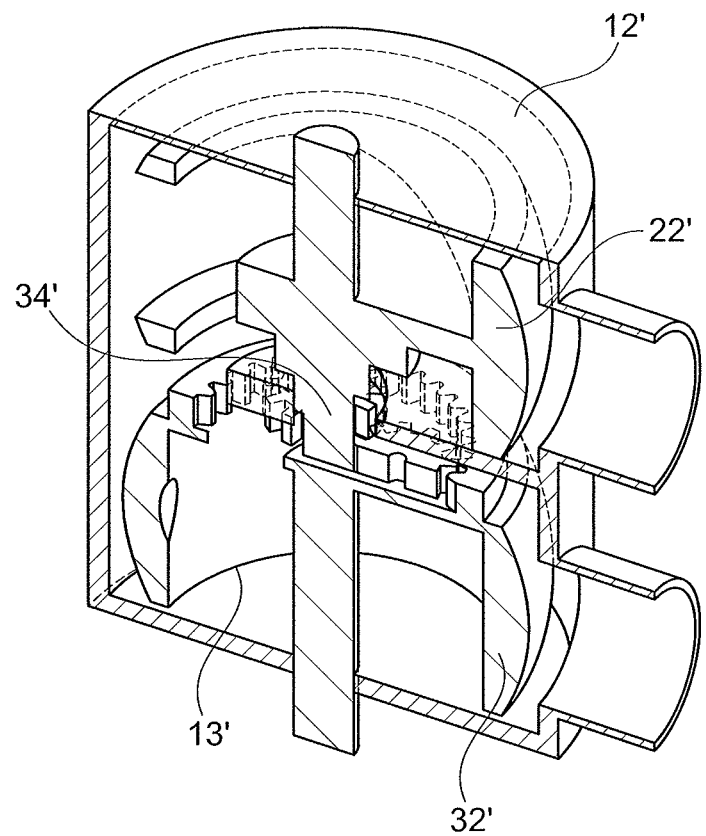
FIG. 7A illustrates a perspective cut-away view of an alternative embodiment of a housing.
Figure 7B:
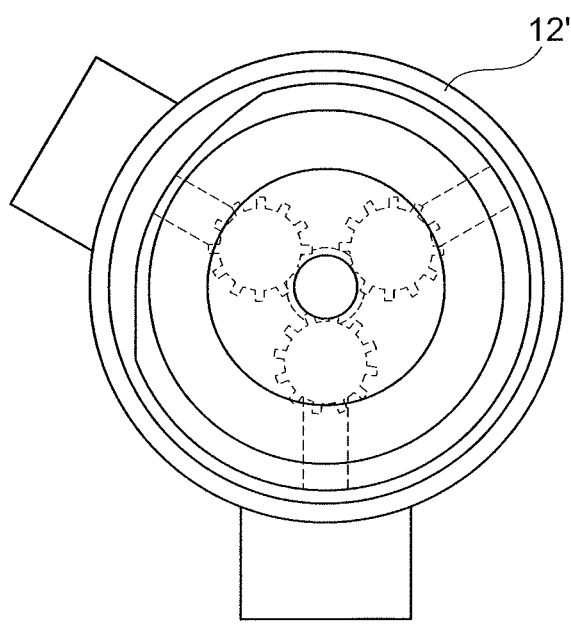
FIG. 7B illustrates a top view of the housing of FIG. 7A through a first section.
Figure 7C:
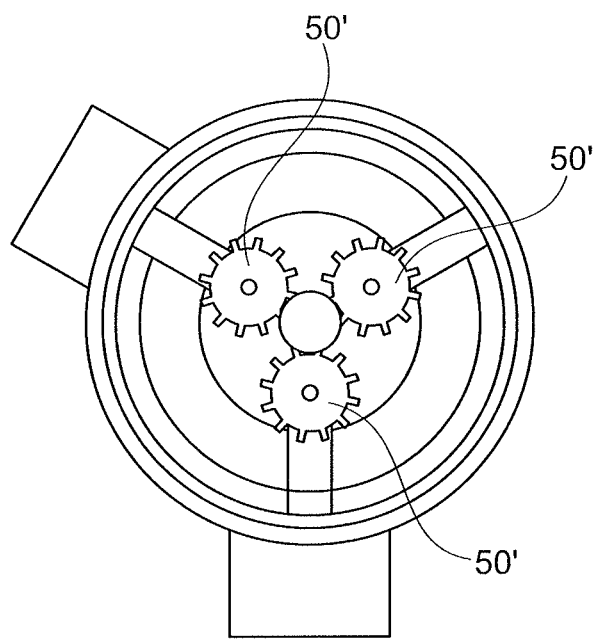
FIG. 7C illustrates a top view of the housing of FIG. 7A through a second section.
Figure 7D:
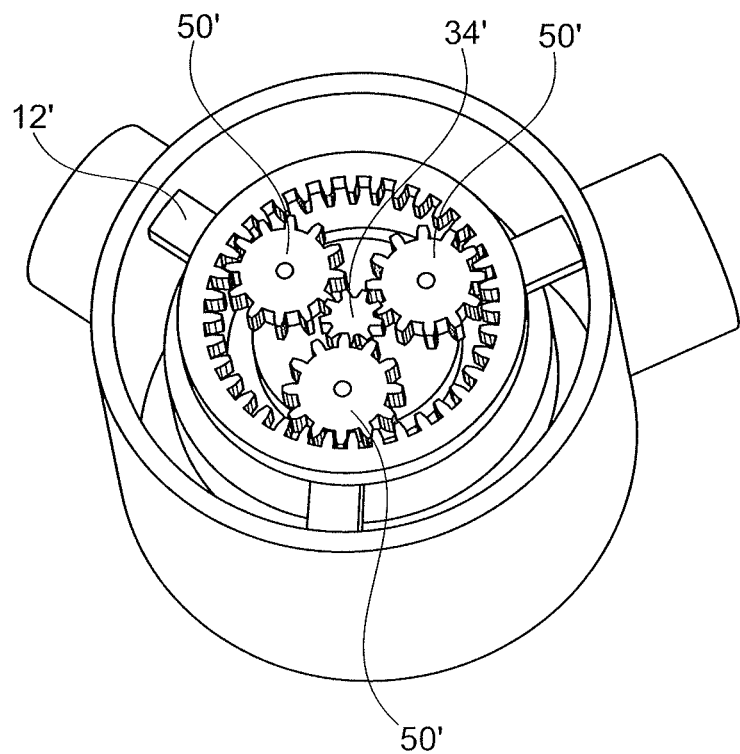
FIG. 7D illustrates a perspective view of a gear arrangement of the housing of FIG. 7A.
Figure 8A:
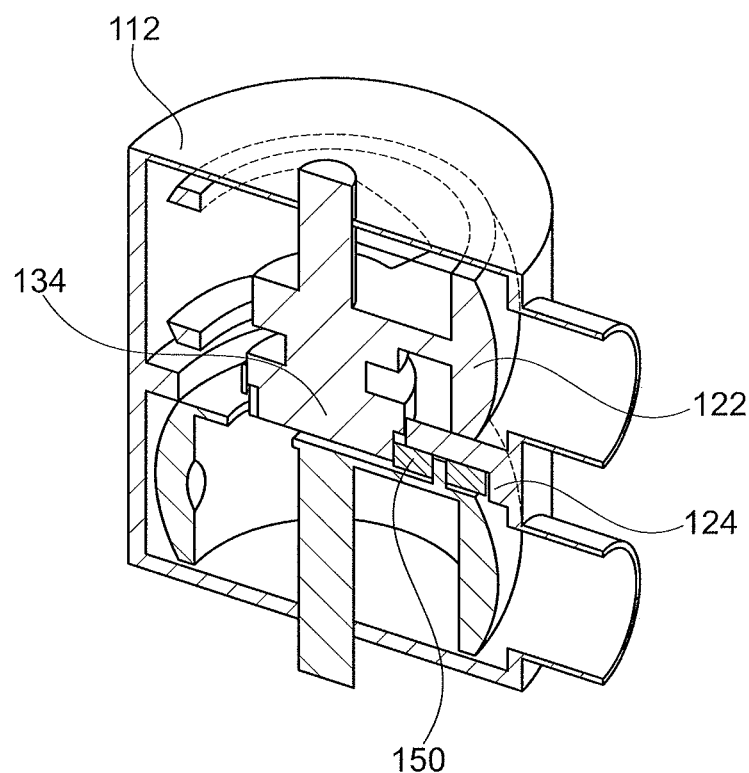
FIG. 8A illustrates a perspective cut-away of an alternative embodiment of a housing.
Figure 8B:
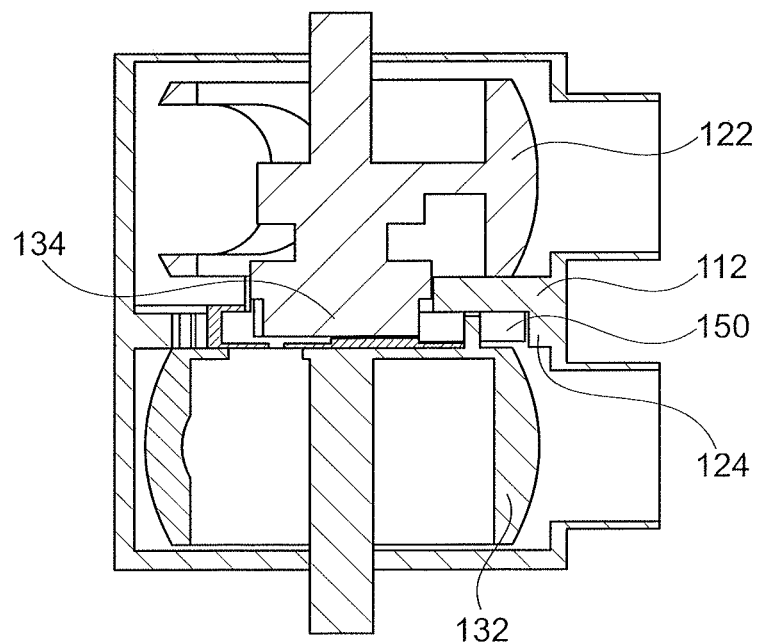
FIG. 8B illustrates a side cut-away view of the housing of FIG. 8A.
Figure 8C:
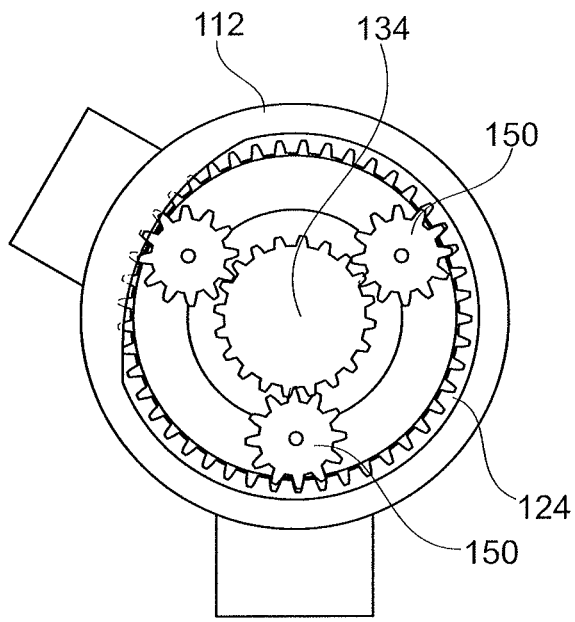
FIG. 8C illustrates a top view of the housing of FIG. 8A through a first section.
Figure 8D:
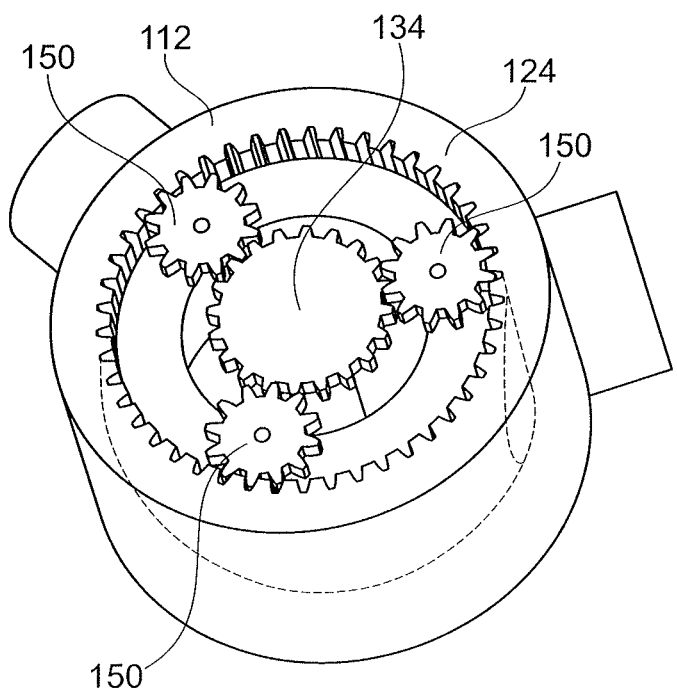
FIG. 8D illustrates a perspective view of a gear arrangement of the housing of FIG. 8A.

FIGS. 5A, 5B, and 6A-6G illustrate more details regarding specific control points and flow patterns through the valve arrangement 10. FIG. 5A shows the lines 119a, 119a' and lines 119b, 119b' entering into the housing 12. The exchanger lines 119c, 119c' are not shown in FIG. 5A.

Based on the configuration of the valve arrangement 10, at least seven distinct control points are possible, as shown in FIG. 5B and FIGS. 6A-6G. FIG. 5B is a schematic diagram that illustrates seven control points, labeled control points 1-7.

Control point 1 of FIG. 5B corresponds to FIG. 6A; control point 2 of FIG. 5B corresponds to FIG. 6B; control point 3 of FIG. 5B corresponds to FIG. 6C; control point 4 of FIG. 5B corresponds to FIG. 6D; control point 5 of FIG. 5B corresponds to FIG. 6E; control point 6 of FIG. 5B corresponds to FIG. 6F, and control point 7 of FIG. 5B corresponds to FIG. 6G.

As shown in FIG. 6A, control point 1 corresponds to a condition in which only the port 19b' is open. As shown in FIG. 6B, control point 2 is provided in which both the port 19b' is open and the port 19b is open. As shown in FIG. 6C, control point 3 is provided in which only the port 19b is open. As shown in FIG. 6D, control point 4 is provided in which the ports 19a', 19b' and ports 19a, 19b are closed, and there is zero inlet flow. In FIG. 6E, control point 5 is provided in which only the port 19a is open. As shown in FIG. 6F, control point 6 is provided in which the port 19a is open and the port 19a' is open. In FIG. 6G, control point 7 corresponds to a condition in which only the port 19a' is open. In each of the control points, the exchanger outlets remain open.

As shown in FIGS. 7A-7D, a sun gear 34' is defined on the first valve body 22', a ring gear 24' is formed as part of second valve body 32', and the planetary gears 50' are arranged between the sun gear 34' and the ring gear 24'.

As shown in FIGS. 8A-8D, the housing 112 includes an integrally formed ring gear 124, the sun gear 134 is formed on the first valve body 122, and the planetary gears 150 are arranged on the second valve body 132.

One of ordinary skill in the art would understand that the valve actuator described herein can be electrically controlled and is continually variable.

Having thus described the present invention in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LOG OF REFERENCE NUMERALS planetary valve arrangement 10
housing 12
chamber 13
first chamber 14
gear arrangement 15
second chamber 16
wall 17
ports 18, 19
first valve assembly 20
first valve body 22
first shaft 23
ring gear 24
second valve assembly 30
second valve body 32
second shaft 33
sun gear 34
bushing 40
planetary gear retainers 42
planet gears 50
driving input 55
actuator 60
lines 119

What is claimed is:

1. A valve arrangement comprising: a housing defining at least one chamber, the housing including a plurality of ports; a first valve assembly including a first valve body arranged within the at least one chamber; a second valve assembly including a second valve body arranged within the at least one chamber; and a gear arrangement directly engaging both: gear teeth integrally formed on the first valve body, and gear teeth integrally formed on the second valve body, the gear arrangement being configured to drive the first valve body in a first rotational direction and configured to drive the second valve body in a second rotational direction, and the second rotational direction is opposite from the first rotational direction.

2. The valve arrangement of claim 1, wherein the first valve body and the second valve body both define a single circumferential opening.

3. The valve arrangement of claim 1, wherein the gear arrangement includes:
   a sun gear formed on the first valve body;
   a ring gear formed on the second valve body; and
   a plurality of planet gears arranged between the ring gear and the sun gear.

4. The valve arrangement of claim 1, wherein the gear arrangement includes:
   a sun gear formed on the first valve body;
   a ring gear formed on the housing; and
   a plurality of planet gears attached to the second valve body.

5. The valve arrangement of claim 3, further comprising a bushing defining a plurality of planetary gear retainers adapted to support a respective planet gear of the plurality of planet gears.

6. The valve arrangement of claim 3, wherein each planet gear of the plurality of planet gears includes both a first set of teeth and a second set of teeth, and the first set of teeth engage the ring gear and the second set of teeth engage the sun gear.

7. The valve arrangement of claim 6, wherein the first set of teeth are a different size than the second set of teeth.

8. The valve arrangement of claim 1, further comprising an actuator adapted to engage at least one of the first valve body or the second valve body to provide a driving input.

9. The valve arrangement of claim 1, wherein the first valve body includes a first shaft extending outside of the at least one chamber, and the second valve body includes a second shaft extending outside of the at least one chamber.

10. The valve arrangement of claim 9, wherein the first valve body and the first shaft are integrally formed as a single unitary component, and the second valve body and the second shaft are integrally formed as a single unitary component.

11. The valve arrangement of claim 1, wherein the plurality of ports includes a first plurality of ports and a second plurality of ports connected to the at least one chamber,
   the first plurality of ports including:
      a first port adapted to be connected to a first cooling input;
      a second port adapted to be connected to a first heating input; and
      a third port adapted to be connected to a first heat exchanger outlet;
   the second plurality of ports including:
      a first port adapted to be connected to a second cooling input;
      a second port adapted to be connected to a second heating input; and
      a third port adapted to be connected to a second heat exchanger outlet.

12. The valve arrangement of claim 1, wherein the at least one chamber includes a first chamber and a second chamber, and the first valve assembly is arranged within the first chamber and the second valve assembly is arranged within the second chamber.

13. A valve arrangement comprising:
   a housing defining a chamber, the housing including a plurality of ports connected to the chamber;
   a first valve assembly including a first valve body and a sun gear formed on the first valve body;
   a second valve assembly including a second valve body and a ring gear formed on the housing;
   a plurality of planet gears arranged between the ring gear and the sun gear such that teeth of the planet gears engage both the ring gear and the sun gear, each planet gear of the plurality of planet gears arranged on a respective gear retainer of a plurality of planetary gear retainers, wherein each planet gear of the plurality of planet gears includes both a first set of teeth and a second set of teeth, the first set of teeth being a different size than the second set of teeth, and the first set of teeth engage the ring gear and the second set of teeth engage the sun gear.

14. The valve arrangement of claim 13, further comprising an actuator adapted to engage at least one of the first valve body or the second valve body.

15. The valve arrangement of claim 14, wherein the actuator is adapted to rotate the first valve body in a first rotational direction and rotate the second valve body in a second rotational direction that is opposite from the first rotational direction.

16. The valve arrangement of claim 13, wherein the plurality of ports includes a first plurality of ports and a second plurality of ports connected to the chamber,
   the first plurality of ports including:
      a first port adapted to be connected to a first cooling input;
      a second port adapted to be connected to a first heating input; and
      a third port adapted to be connected to a first heat exchanger outlet;
   the second plurality of ports including:
      a first port adapted to be connected to a second cooling input;
      a second port adapted to be connected to a second heating input; and
      a third port adapted to be connected to a second heat exchanger outlet.

17. The valve arrangement of claim 13, wherein a ratio of 1:−1 is provided between the first valve body and the second valve body based on engagement between the sun gear, the ring gear, and the plurality of planet gears.

18. A method of selectively providing flows through a housing, the method comprising:
   providing a valve arrangement including:
      a housing defining a chamber, the housing including a plurality of ports;
      a first valve assembly including a first valve body and a sun gear, the first valve body including a first shaft extending outside of the at least one chamber;
      a second valve assembly including a second valve body and a ring gear, the second valve body including a second shaft extending outside of the at least one chamber;
      an input shaft connected to at least one of the first valve assembly or the second valve assembly; and
      a gear arrangement arranged between the first valve body and the second valve body; and
   rotating the input shaft to provide a driving input to the gear arrangement, such that the first valve body rotates in an opposite direction from the second valve body.

* * * * *